United States Patent
Sun et al.

(10) Patent No.: US 11,858,118 B2
(45) Date of Patent: Jan. 2, 2024

(54) ROBOT, SERVER, AND HUMAN-MACHINE INTERACTION METHOD

(71) Applicant: HUAWEI TECHNOLOGIES CO., LTD., Guangdong (CN)

(72) Inventors: Wenhua Sun, Shenzhen (CN); Jiali Fu, Shenzhen (CN); Heng Liao, Shenzhen (CN); Huimin Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 1065 days.

(21) Appl. No.: 16/457,676

(22) Filed: Jun. 28, 2019

(65) Prior Publication Data

US 2019/0337157 A1    Nov. 7, 2019

Related U.S. Application Data

(63) Continuation of application No. PCT/CN2017/119107, filed on Dec. 27, 2017.

(30) Foreign Application Priority Data

Dec. 31, 2016    (CN) .......................... 201611267452.1

(51) Int. Cl.
*B25J 11/00* (2006.01)
*G06N 20/00* (2019.01)
(Continued)

(52) U.S. Cl.
CPC ............ *B25J 11/001* (2013.01); *G06N 20/00* (2019.01); *G06V 40/176* (2022.01); *G09B 5/065* (2013.01); *G10L 25/63* (2013.01)

(58) Field of Classification Search
CPC ........ B25J 11/001; G10L 25/63; G09B 5/125; G09B 5/065; G06N 20/00; G06V 40/176
(Continued)

(56) References Cited

U.S. PATENT DOCUMENTS 6,175,772 B1 * 1/2001 Kamiya ................. G06N 3/008
  701/1
6,230,111 B1 * 5/2001 Mizokawa ............. G06N 3/004
  702/182
(Continued)

FOREIGN PATENT DOCUMENTS

CN          1908965 A      2/2007
CN        102375918 A      3/2012
(Continued)

OTHER PUBLICATIONS

Simina Emerich, Eugen Lupu, Anca Apatean, "Emotions recognition by speech and facial expressions analysis", Aug. 2009, Communication Department, Technical University of Bluj-Napoca, Romania.*

(Continued)

*Primary Examiner* — Mohamed A. Wasel
*Assistant Examiner* — John Fan
(74) *Attorney, Agent, or Firm* — WOMBLE BOND DICKINSON (US) LLP

(57) ABSTRACT

Embodiments of the present invention provide a human-machine interaction method, including: detecting and collecting, by a robot, sensing information of a companion object of a target object and emotion information of the target object that is obtained when the target object interacts with the companion object; extracting, by the robot, an emotion feature quantity based on the emotion information, determining, based on the emotion feature quantity, an emotional pattern used by the target object to interact with the companion object, determining, based on the emotional pattern, a degree of interest of the target object in the companion object, extracting behavioral data of the companion object from the sensing information based on the degree of interest, and screening the behavioral data to (Continued)

obtain simulated object data; and simulating, by the robot, the companion object based on the simulated object data.

14 Claims, 4 Drawing Sheets

(51) Int. Cl.
  *G09B 5/06* (2006.01)
  *G10L 25/63* (2013.01)
  *G06V 40/16* (2022.01)
(58) Field of Classification Search
  USPC .......................................................... 434/236
  See application file for complete search history.

(56) References Cited

U.S. PATENT DOCUMENTS

| | | | | |
|---|---|---|---|---|
| 8,447,607 | B2* | 5/2013 | Weider | G10L 15/22 704/250 |
| 9,216,508 | B2 | 12/2015 | Ruuspakka et al. | |
| 2007/0033050 | A1 | 2/2007 | Asano et al. | |
| 2009/0055019 | A1* | 2/2009 | Stiehl | B25J 9/1671 901/17 |
| 2011/0131165 | A1 | 6/2011 | Wu | |
| 2015/0314454 | A1* | 11/2015 | Breazeal | B25J 11/001 700/259 |
| 2016/0199977 | A1 | 7/2016 | Breazeal | |

FOREIGN PATENT DOCUMENTS

| | | |
|---|---|---|
| CN | 103996155 A | 8/2014 |
| CN | 104767980 A | 7/2015 |
| CN | 105082150 A | 11/2015 |
| CN | 105345818 A | 2/2016 |
| CN | 105843118 A | 8/2016 |
| CN | 105868827 A | 8/2016 |
| CN | 107053191 A | 8/2017 |
| JP | 2006123136 A | 5/2006 |
| JP | 2009248193 A | 10/2009 |
| JP | 2011237970 A | 11/2011 |
| JP | 2011253389 A | 12/2011 |
| JP | 2016012342 A | 1/2016 |
| KR | 20100001928 A | 1/2010 |
| TW | 1484452 B * | 5/2015 |
| WO | 2005014242 A1 | 2/2005 |
| WO | 2012141130 A1 | 10/2012 |
| WO | 2016103881 A1 | 6/2016 |

OTHER PUBLICATIONS

Qingqing Grassland:"A picture of the home WiFi signal strength distribution map tells you where the WiFi signal is best in your home", Retrieved from the internet:http://www.22zy.net/news/7411.html, May 25, 2015. total 2 pages.

Phoebe Liu, Data-Driven HRI: Learning Social Behaviors by Example From Human-Human Interaction, IEEE Transactions On Robotics, IEEE, Aug. 31, 2016, vol. 32, No. 4, pp. 988-1008.

Tsuyoshi Yabushita et al. Conversational Agent Learning facial contagion of actual conversation example, [online], Japanese, Information Processing Society of Japan, Sep. 11, 2017, pp. 262-265. with English abstract.

IEEE Transactions on Robotics: "Data-Driven HRI: Learning Social Behaviors by Example From Human-Human Interaction" (Phoebe Liu et al.)—Aug. 1, 2016published by IEEE Service Center in Piscataway, NJ, USA vol. 32, No. 4, pp. 988-1008, XP011620530.

Liu Phoebe et al: How to train your robot—teaching service robots to reproduce human social behavior, The 23rd IEEE International Symposium Onrobot and Human Interactive Communication, IEEE, Aug. 25, 2014, pp. 961-968, XP032664805.

* cited by examiner

ROBOT, SERVER, AND HUMAN-MACHINE INTERACTION METHOD

CROSS-REFERENCE TO RELATED APPLICATIONS

This application is a continuation of International Application No. PCT/CN2017/119107 filed on Dec. 27, 2017, which claims priority to Chinese Patent Application 201611267452.1, filed on Dec. 31, 2016. The disclosures of the aforementioned applications are hereby incorporated by reference in their entireties.

TECHNICAL FIELD

The present invention relates to an artificial intelligence device, and in particular, to an education companion robot with a learning capability.

BACKGROUND

An existing intelligent robot in the industry has social emotion cognition and expression capabilities, and learns about people's characteristics and emotions by using technologies such as cloud computing, a robot learning technology, and voice recognition and facial recognition, to perform entertainment interaction, express emotions, exchange feelings, and the like with people. Artificial intelligence development and social requirements are accompanied with appearance of child education robots and companion robots. However, most current child robots perform simple voice or behavior interaction, for example, simple movement, conversation, or storytelling, and cannot perform machine learning for an object that interests the children. It is difficult for the robots to emotionally interact with the children and help with growth.

SUMMARY

Embodiments of the present invention provide a companion robot, especially an education robot for children. The robot provided in the embodiments of the present invention can learn about interest and a habit of the child through long-time learning; and adaptively select, based on constantly changing preferences of the child in a growing process, content that the child likes, to interact with the child. Further, the robot may be controlled by a parent or a guardian; and select content approved by the parent, to interact with the child. The robot can read requirements of the child and the parent, help with growth of the child, and share, with the child, an object that interests the child. In one embodiment of the present invention, an object accompanied by the robot is also referred to as a companion target or a target object, and may be a child. In real life, a caregiver or a guardian of the target object (the child) is referred to as a companion object of the target object (the child). According to one embodiment of the present invention, the companion robot extracts, from an image, a surrounding event and a companion object to which the child has reactions, screens out appropriate data, and sorts out simulated object data. The simulated object data may be referred to as a digital human or a digital human resource. The simulated object data is used to simulate or describe the companion object. The robot simulates the companion object by using the simulated object data, to simulate the guardian or the parent of the child in reality and interact with the child. The companion robot in this embodiment of the present invention can exchange emotions with the child and help with growth education.

The companion robot in one embodiment of the present invention first detects and collects sensing information of a companion object of a target object and emotion information of the target object that is obtained when the target object interacts with the companion object. A sensor module is disposed on the robot. The sensor module may include various appropriate sensors, such as a camera, an acceleration sensor, and a gyroscope. The sensor module may collect an image, a video, or sound of the companion object by using the camera or another sensor, to obtain the sensing information of the companion object; and may further collect an environment image or video to enrich the sensing information. The sensor module collects an image, a video, or the like of the target object by using the camera or the another sensor, to record content in the emotion information of the target object.

The robot extracts an emotion feature quantity based on the emotion information, determines, based on the emotion feature quantity, an emotional pattern used by the target object to interact with the companion object, determines, based on the emotional pattern, a degree of interest of the target object in the companion object, extracts behavioral data of the companion object from the sensing information based on the degree of interest, and screens the behavioral data to obtain simulated object data. The simulated object data is used to describe the companion object.

In one embodiment, when the target object (the child) interacts with the companion object (the parent), the robot may obtain an emotion of the target object (the child), and a behavior or a voice of the parent that makes the child laugh, angry, or the like. The robot may determine the emotional pattern of the target such as joyfulness, delight, fear, or disgust by using the emotion information of the target object; and may further obtain an emotion changing process or the like of the target object through analysis. For example, the robot may capture a behavior manner that makes the child happy, to obtain behavioral data of this behavior manner; capture a behavior manner that makes the child feel disgusting, to obtain behavioral data of this behavior manner; and capture a behavior manner that makes the child have slight reactions, to obtain behavioral data of this behavior manner. The robot determines, based on an interest changing process or a comprehensive reaction attitude of the child, a degree of interest of the child in a person, a thing, or a behavior. The robot may determine, by using an emotion of the target object, whether the target is interested in an interaction object, and record a degree of interest. The robot screens out behavioral data from the behavioral data of the companion object based on the degree of interest. The behavioral data may include an expression, a body action, a tone, or the like. For example, the robot may screen out a behavior that interests the target object, and generate the simulated object data by using behavioral data that is used for describing the behavior. Subsequently, the robot may simulate the interaction object based on a virtual simulated object.

In one embodiment, the behavioral data does not need to be screened out based on the degree of interest, and the robot extracts the behavioral data of the companion object from the sensing information based on the emotional pattern. In this way, simulated object data used to make the child enter a specific emotion may be generated. In this manner, the robot does not overall evaluate a degree of interest of the child in a person or a thing, but instead, the robot directly creates simulated object data that makes the child enter an emotion, directly pacify the child, or educate the child. The robot simulates a person or a thing in reality based on the simulated object data.

The robot may simulate the companion object based on the simulated object data, for example, may directly simulate the mother of the child to interact with the child, especially when the mother of the child is absent temporarily. Alternatively, when the child is particularly interested in a specific cartoon figure, the robot may create simulated object data corresponding to the cartoon figure, and simulate the cartoon figure to interact with the child. Alternatively, the robot may simulate a specific task, educate the child when interacting with the child, and help with growth or knowledge learning of the child.

The companion robot in one embodiment of the present invention may further apportion a data processing part to a server. The robot is responsible for collecting the sensing information of the companion object of the target object and the emotion information of the target object that is obtained when the target object interacts with the companion object, and sending the sensing information and the emotion information to a service server. The service server completes information analysis, to generate the simulated object data. Then, the simulated object data is sent to the robot. After obtaining the simulated object data, the robot simulates the companion object based on the simulated object data, to interact with the companion target.

The robot in one embodiment of the present invention can adaptively select the content that the child likes, to interact with the child, and select and simulate an appropriate companion object based on an emotion of the child during interaction.

In one embodiment, screening the behavioral data to obtain simulated object data may include: screening the behavioral data to extract a behavioral key feature, and generating the simulated object data by using the key feature, where the behavioral data includes a body action, the behavioral key feature includes a body key point or a body action unit, and the key feature is generated through statistical learning or machine learning; or the behavioral data includes an expression, the behavioral key feature includes a partial face key point or a facial action unit, and the key feature is generated through pre-specification or machine learning; or the behavioral data includes a tone, the behavioral key feature includes an acoustic signal feature in voice input of the companion object, and the key feature is generated through pre-specification or machine learning.

A possible embodiment of the screening the behavioral data to obtain a simulated object may be: determining, by a service, a guardian, or a system, a simulation constraint condition in advance, matching the behavioral data with the simulation constraint condition, and generating the simulated object data by using behavioral data that meets the simulation constraint condition. In practice, a thing, an audio/video material, or the like that interests the child or that makes the child feel relatively happy during interaction may be not beneficial to the growth of the child, and therefore some data that needs to be removed even though the child is interested in the data is removed through screening by using the constraint condition. Alternatively, the child may not be extremely interested in the behavioral data, but the data is beneficial to the growth of the child or can correct erroneous cognition of the child, and therefore behavioral data in which the child has a low degree of interest may be put, by using the constraint condition, into source data used for generating the simulated object data. In a more direct manner, the behavioral data is sent to a data terminal, a selection instruction of the data terminal is received, and the simulated object data is generated based on the selection instruction. The data terminal may be a smartphone or an application on the smartphone. The parent or the guardian directly performs an operation on the data terminal, and generates the simulated object data by using the selection instruction sent by the data terminal.

In one embodiment, the data terminal may communicate with the robot. The data terminal may directly send an instruction to the robot, and simulate a particular object or manner to interact with the child. A mode in which the robot receives an instruction to work is entered. In this way, a data terminal holder (the parent or another guardian) can enable, based on a more specific requirement, the robot to interact with the child.

In one embodiment, the robot may store the simulated object data, and generate a simulated object database; or send the simulated object data to a service server, and create a simulated object database on the service server. New simulated data may be constantly added to the simulated object database. When the robot needs to simulate a specific companion object, the robot may directly select appropriate or corresponding simulated object data from the simulated object database to perform companion simulation.

During interaction between the robot and the child, based on a current scenario or requirement, the robot may adaptively select to simulate a person or a thing, or may adaptively select to actively play an audio/video material. That is, the robot collects emotion information of the target object again, or constantly collects a current emotion of the child, a current environment, or the like; determines a current interaction scenario; selects, from the simulated object database based on the current interaction scenario, simulated object data used in current interaction; and simulates a corresponding companion object based on the simulated object data used in the current interaction, to interact with the target object.

An embodiment of the present invention further provides a service server. The server includes a processor with a processing capability and a processing function, to perform each method step or function in interaction with a robot in the foregoing solution.

An embodiment of the present invention provides the companion robot, the server, and a human-machine interaction method based on the foregoing invention content. The robot extracts, from an image, a surrounding event to which the companion target has reactions, screens out appropriate data, displays or plays the appropriate data to the child for interaction, screens out, based on emotional perception, content to interact with a target object. Therefore, a more intelligent companion function is implemented.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following further describes the technical solutions of the embodiments of the present invention in detail with reference to the accompanying drawings in the embodiments of the present invention. Apparently, the described embodiments are merely some but not all of the embodiments of the present invention.

Figure 1:
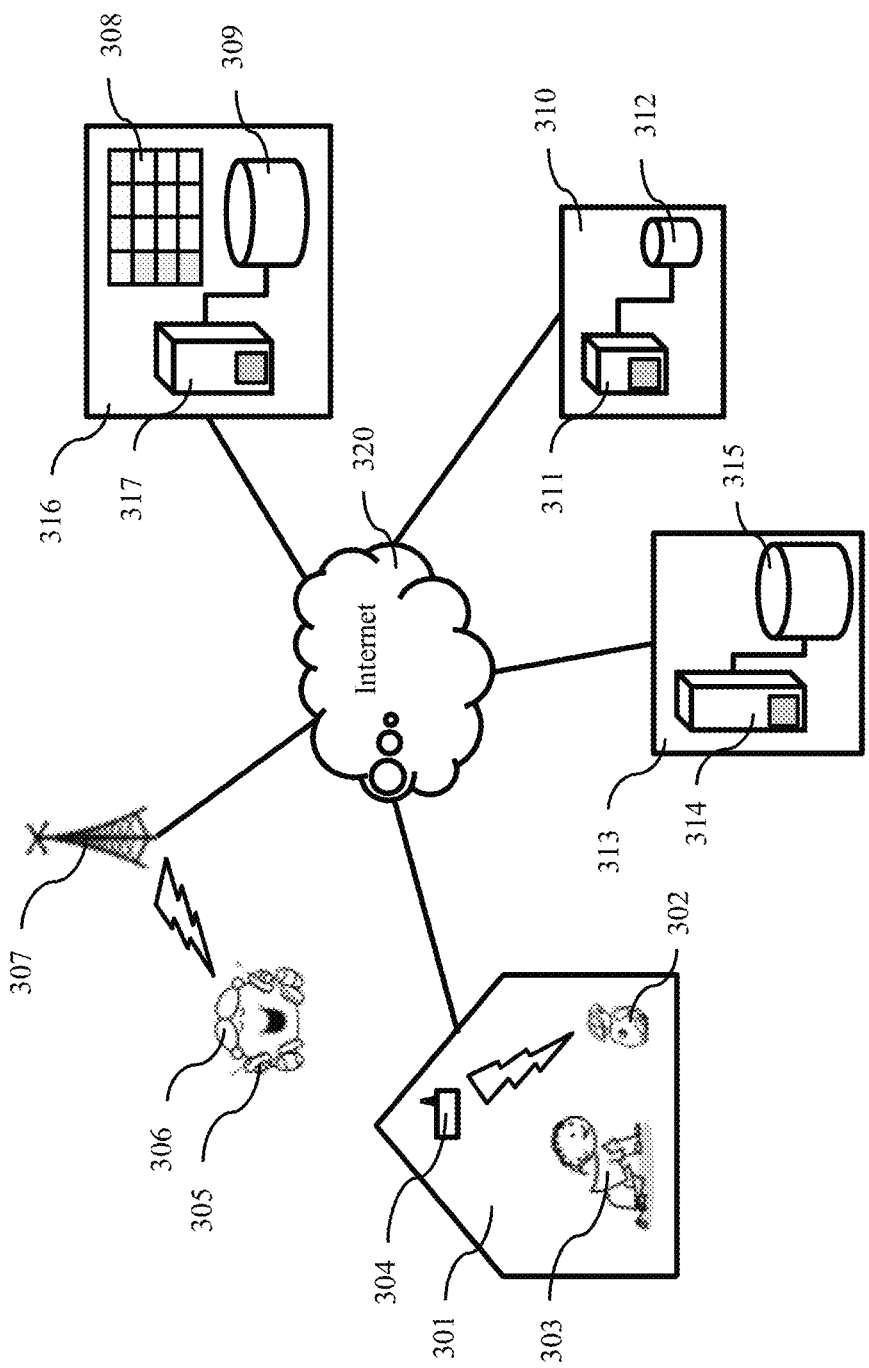
FIG. 1 is a schematic diagram of a companion robot and a system architecture of a usage environment according to an embodiment of the present invention.

FIG. 1 shows a companion robot and a system architecture of a usage environment of the present invention. The usage environment in FIG. 1 is applicable to any scenario (for example, a community, a street, an administrative district, a province, a country, a transnational scenario, or even a global scenario), and includes the following units: a family or child-care institution 301 including at least one child 303, a child interaction robot 302, and at least one indoor radio access network 304; a parent 306 (father or mother, an immediate family member, another guardian, or the like) and a portable intelligent terminal 305 of the parent; an outdoor radio access network 307 that provides a remote wireless network access service for the intelligent terminal 305; a child-care service institution 316 that provides a professional data service for a child-care service and that includes a child-growth cloud server 317, a child-growth model database 308, and a child-care knowledge base 309; a social public service institution 310 that provides government public data support for the child-care service, including but being not limited to weather forecast, a list of healthcare facilities, epidemic situation information, an emergency notice, and the like, where the social public service institution 310 includes a social public service cloud server 311 and a social public service cloud database 312; and at least one third-party network cloud service institution 312 that provides a refined professional network cloud data service such as instant messaging, a child-care service social application, a network audio/video service, online shopping, payment and logistics tracking, or comments on and votes for a community and a medical institution and that includes a third-party network service cloud server 314 and a third-party network service cloud database 315. The system architecture of the usage environment further includes the Internet 320 that is used by a network operator to provide a network service.

Figure 2:
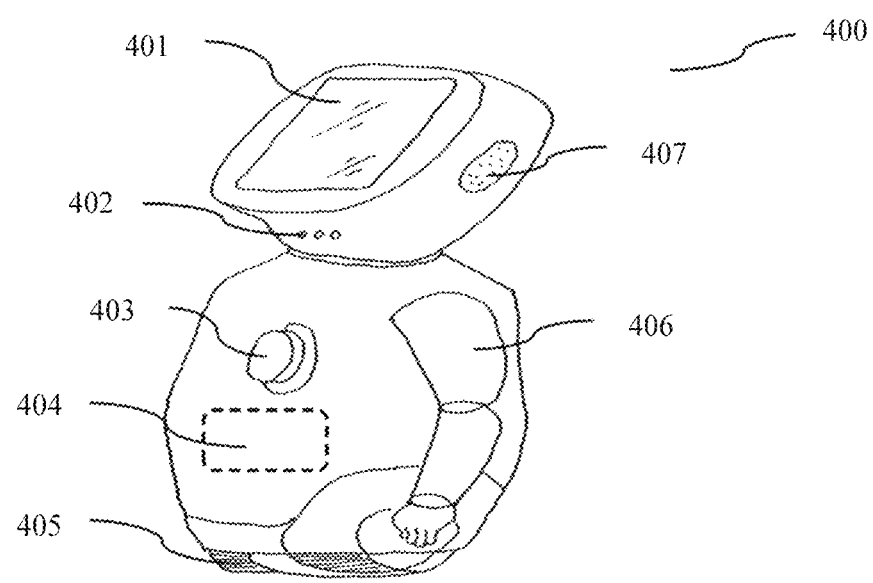
FIG. 2 is a schematic diagram of a product shape of a companion robot according to an embodiment of the present invention.

A product shape implemented in the embodiments of the present invention is shown as 400 in FIG. 2, and includes: a touch display screen 401, configured to display graphic image information to a target object, and receive a touch control signal from a user; a speaker module 407, configured to provide a sound output signal for the target object; a microphone array and sensor module 402, configured to detect a feature of the target object, such as sound, an expression, or a behavior; a start/pause/emergency button 403, configured to provide a simple operation instruction for the target object, and respond to an interrupt instruction of the user in an emergency case; and a processing and operation module 404, configured to calculate and output a control instruction to a child-care robot based on a user status signal that is input by the microphone array and sensor module 402, a user operation instruction of the button 403, guardian request information of a cared child from a network, a service instruction of a child-care service institution from the network, third-party network cloud service data, and the like. The child-care robot outputs sound, an image, a body action and movement, and the like. The child-care robot further includes a crawler-type/wheel-type mobile mechanical apparatus 405 and a mechanical arm 406.

Figure 3:
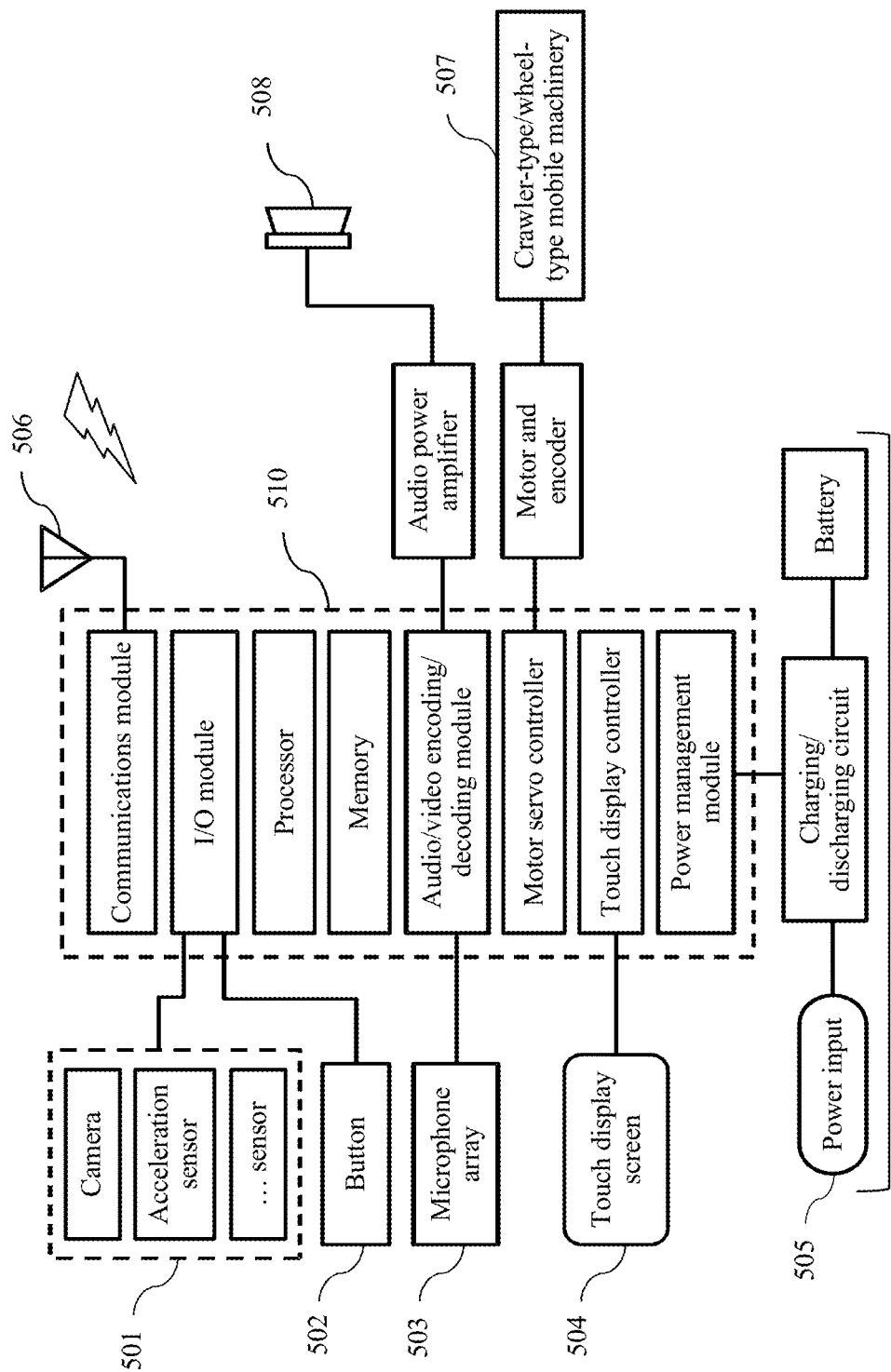
FIG. 3 is a schematic diagram of components of a companion robot according to an embodiment of the present invention.

In one embodiment, a feasible product shape is a robot. FIG. 3 shows a feasible implementation of the core component "processing and operation module" 404 of the robot, including a mainboard 510 and another peripheral functional component. Both a sensor module 501 and a button 502 are connected to an I/O module of the mainboard 510. A microphone array 503 is connected to an audio/video encoding/decoding module of the mainboard 510. A touch display controller of the mainboard 510 receives touch input of a touch display screen 504, and provides a display drive signal. A motor servo controller drives a motor and encoder 507 based on a program instruction, and drives the crawler-type/wheel-type mobile mechanical apparatus 405 and the mechanical arm 406, to form movement and body languages of the robot. Sound is obtained after output of the audio/video encoding/decoding module is pushed to a speaker 508 by using a power amplifier. A hardware system further includes a processor and a memory on the mainboard 510. In addition to an algorithm, an execution program, and a configuration file of the robot, the memory also records audio, video, image files and the like that are required when the robot performs caring, and further includes some temporary files generated during program running. A communications module of the mainboard 510 provides a function of communication between the robot and an external network, and may be a short-range communication module such as a Bluetooth module or a WiFi module. The mainboard 510 further includes a power management module, configured to implement battery charging and discharging, and energy saving management of a device by using a connected power system 505. The processor is a most core component, has operation and processing capabilities, and manages and controls cooperation with another component.

The sensor module 501 of the robot detects and collects sensing information of a companion object of a target object and emotion information of the target object that is obtained when the target object interacts with the companion object. The sensing information includes at least one of view information and voice information, and the emotion information includes at least one of view information and voice information. Audio, a video, or an image may be captured by a camera, and the detection and collection may alternatively be completed by another sensor or may be completed through cooperation with another sensor. The processor extracts an emotion feature quantity based on the emotion information, determines, based on the emotion feature quantity, an emotional pattern used by the target object to interact with the companion object, determines, based on the emotional pattern, a degree of interest of the target object in the companion object, extracts behavioral data of the companion object from the sensing information based on the degree of interest, screens the behavioral data to obtain simulated object data, and generates an action instruction based on the simulated object data. A behavior execution module is configured to receive the action instruction of the processor and interact with the target object. The behavior execution module may include components that can interact with the outside, such as the crawler-type/wheel-type mobile mechanical apparatus 405, the mechanical arm 406, the touch display screen 401, and a microphone.

Further, in another embodiment, the processor of the robot has only a simple processing function, and the simulated object data is processed by a service server. A communications module is further disposed on the robot, and communicates with an intelligent terminal and the like by using an antenna and the service server. The communications module sends, to the service server, the sensing information of the companion object of the target object and the emotion information of the target object that is obtained when the target object interacts with the companion object, and receives the simulated object data sent by the service server. Then, the processor obtains the simulated object data, and generates the action instruction based on the simulated object data.

A memory is further disposed on the robot, and the memory stores a simulated object database to record the simulated object data.

Figure 4:
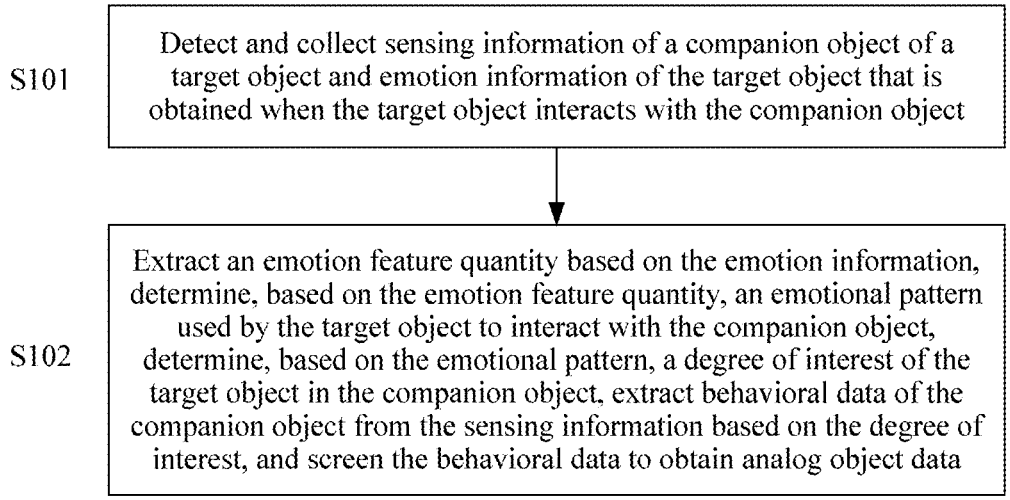
FIG. 4 is a flowchart of a human-machine interaction method according to an embodiment of the present invention.

Referring to FIG. 4, FIG. 4 is a flowchart of a method for interaction between a robot and a target object according to an embodiment of the present invention. Descriptions are provided by using an example. For example, the target object is a child.

Block S101. Detect and collect sensing information of a companion object of the target object and emotion information of the target object that is obtained when the target object interacts with the companion object.

The sensing information includes at least one of view information and voice information, and the emotion information includes at least one of view information and voice information. A camera may be started by using a machine, to monitor daily life of the child, monitor an expression, heartbeats, an eye expression, and the like of the child, determine an emotion of the child, and further capture an image at a moment corresponding to the emotion to obtain emotion information of the child.

The robot may capture an image or a video at a current moment based on a child behavior (an expression, an action, or the like). The captured image may be one image, or may be several images, a video in a period of time, or the like. Image content may include the child behavior, an ambient environment, an event of interest to the child, and the like. The captured image may be locally stored on the robot, or may be uploaded to a cloud server.

Block S102. Extract an emotion feature quantity based on the emotion information, determine, based on the emotion feature quantity, an emotional pattern used by the target object to interact with the companion object, determine, based on the emotional pattern, a degree of interest of the target object in the companion object, extract behavioral data of the companion object from the sensing information based on the degree of interest, and screen the behavioral data to obtain simulated object data.

The simulated object data is used by the robot to simulate the companion object, and the simulated object data is used to describe the companion object. It may be considered that the simulated object data is digital human data or a digital human resource. When the simulated object data is obtained, a digital human image can be obtained from the data.

Further, in an embodiment, the screening the behavioral data to obtain simulated object data may be: screening the behavioral data to extract a behavioral key feature, and generating the simulated object data by using the key feature. The behavioral data includes a body action, the behavioral key feature includes a body key point or a body action unit, and the key feature is generated through statistical learning or machine learning; or the behavioral data includes an expression, the behavioral key feature includes a partial face key point or a facial action unit, and the key feature is generated through pre-specification or machine learning; or the behavioral data includes a tone, the behavioral key feature includes an acoustic signal feature in voice input of the companion object, and the key feature is generated through pre-specification or machine learning.

For example, a method for extracting a visual feature from the sensing information (for example, the video or the image) is as follows: 83 key feature points of a face are first tracked by using a Bayesian shape model method with constraints, and then a three-dimensional (3D) rigid motion of a head and three-dimensional flexible facial deformation are estimated by using a minimum energy function method. For a formed three-dimensional grid image, seven action unit vectors (AUV) are used: AUV6-eye closing, AUV3-eyebrow drooping, AUV5-outer eyebrow raising, AUV0-upper lip raising, AUV2-lip stretching, and AUV14-labial angle drooping. Each AUV is a column vector including coordinate displacements of all grid vertices of a unit. While a video sequence is input through fitting by using a Candide-3 facial model, animation parameters of these AUVs may also be obtained. Therefore, for each image in the video, seven-dimensional facial animation parameters are finally obtained as visual emotional features.

Emotional feature dimension reduction includes a linear dimension reduction method such as principal component analysis (PCA) and linear discriminant analysis (LDA), and a non-linear manifold dimension reduction method such as Isomap and local linear embedding (LLE), so that a feature in low-dimensional space better maintains a geometrical relationship of the feature in high-dimensional space.

A theoretical method of continuous emotion description space indicates that in continuous emotion description, it is considered that different emotions change gradually and smoothly, and an emotional status is in a one-to-one correspondence with a space coordinate point with a specific quantity of dimensions. Relatively common continuous emotion description models include an emotion wheel theory and a three-dimensional arousal-pleasure-control degree description. The emotion wheel theory considers that emotions are distributed in a circular structure. A structure center is a natural origin, that is, a state with various emotional factors. However, these emotional factors cannot be reflected due to extremely weak strength at this point. The natural origin extends in different directions to manifest different emotions, and levels of emotions of a same type are further classified as emotional strength changes. In addition, a strength change in emotions of a same type is used as a third dimension for description, and an emotion wheel concept is extended to a three-dimensional space. Based on the description of a two-dimensional (2D) emotion space and an emotion wheel, an emotion-related feature in a video is matched with the space, so that emotions can be effectively described or classified.

The extracted feature is matched with a visual emotion feature database, for example, a Cohn-Kanade video emotion database, to identify a corresponding emotional feature of the child.

A thing is extracted from the image or the video captured by the robot, and an object that interests the child is identified by using the emotional feature, to generate the simulated object data. The robot simulates data about the object based on the simulated object data and then interacts with the child.

The thing may be extracted by using an existing image/voice recognition algorithm. An operation may be locally performed by the robot, or the image or the video may be uploaded to the server and the server performs an operation. Content that the child is watching, a person who interacts with the child, or the like may be extracted.

An expression, a voice, an action, and the like of the person who interests the child and interacts with the child are extracted. The robot obtains appropriate data through learning, to interact with the child. For the person (a companion object B) who interests the child, the robot obtains conversation content, a body action, an expression, and a tone of the companion object B. The robot generates, through machine learning and training performed on the body action, the expression, and the tone of the companion object B, a model used for interacting with the child.

Expression interaction is used as an example, and may specifically include: collecting an expression of a first object when a child A shows interest; extracting each facial action of an expression that interests or does not interest the child; classifying, by using a classification algorithm such as SVM (support vector machine), RF (random forest), or deep learning, the facial actions into a facial action that interests the child or a facial action that does not interest the child; selecting, for expression synthesis of the robot, the facial action that interests the child; and interacting, by the robot, with the child by using a learned expression.

In one embodiment, facial expression data may be extracted and learned. For example, there are 14 groups of facial actions, including: inner eyebrow raising, outer eyebrow raising, eyebrow drooping, upper eyelid raising, cheek raising, eyelid contraction, eyelid tightening, nose raising, upper lip raising, angulus oris pulling, angulus oris contraction, lower angulus oris raising, mouth pulling, mouth opening, and chin drooping.

Voice interaction is used as an example, and may include: collecting a voice signal of a first object when a child A shows interest; extracting each acoustic signal of the voice signal that interests the child A; collecting statistics about a feature of an acoustic signal that interests the child A; synthesizing a robot voice by using the feature of the acoustic signal that interests the child A; and interacting, by the robot, with the child by using a learned voice.

In one embodiment, acoustic data including information such as a fundamental frequency, a speaking speed, and a ratio of unvoiced sound to voiced sound may be extracted and learned. For example, a fundamental frequency signal is obtained by calculating a sum of fundamental frequencies of all voiced frames and then dividing the sum by a quantity of the voiced frames. In different emotional states, three statistical parameters: an average, a range, and a variance of fundamental frequencies have extremely similar distribution trends. Surprise has a greatest fundamental frequency average, followed by delight and anger, and sadness has a lowest fundamental frequency average. The ratio of unvoiced sound to voiced sound is a time ratio of a voiced segment to an unvoiced segment. Delight, anger, and surprise have a slightly higher ratio of unvoiced sound to voiced sound than calmness, and calmness has a slightly higher ratio of unvoiced sound to voiced sound than fear and sadness. The speaking speed is represented by a ratio of a word quantity to voice signal duration corresponding to a sentence. Speaking speeds in cases of anger and surprise are the highest, followed by delight and calmness, and speaking speeds in cases of fear and sadness are the lowest. Therefore, different emotions can be identified by using the foregoing acoustic signal.

Body action interaction is used as an example, and may specifically include: collecting a body action of a first object when a child A shows interest or shows no interest; extracting each body action unit in a case of an expression that interests or does not interest the child; classifying, by using a classification algorithm such as SVM, RF, or deep learning, body action units into a body action unit that interests the child and a body action unit that does not interest the child; selecting, for body action synthesis of the robot, the body action unit that interests the child; and interacting, by the robot, with the child by using a learned body action.

In one embodiment, body action data may be extracted and learned. For example, there are 20 groups of action units, including: body leaning forward, head swing, nodding, head shaking, hand raising, hand clapping, grabbing, walking, squatting, and the like. There are 35 key points, including heads (4), thoracoabdominal parts (7), and arms (6 on each side, and 12 in total), and legs (6 on each side, and 12 in total).

A picture/video in a film that interests the child is taken. The robot obtains appropriate data through learning, to interact with the child. Further, in daily life, the robot detects and collects behavior information of the child, and a manner used herein may be the same as the foregoing manner of collecting the emotion information of the child. To be specific, a same detection and collection process is used, or there is a same collection source. In addition to determining an emotion of the child, and learning about a companion object of the child, the robot may further analyze the collected information to determine a current status of the child, and determine a current interaction scenario, for example, whether the child is currently playing alone or is currently accompanied by a parent. The robot may select, from a simulated object database based on the current interaction scenario, simulated object data used in current interaction, and simulate a corresponding companion object based on the simulated object data used in the current interaction, to interact with the child. For example, if the child currently says that the child misses his/her mother but his/her mother is absent, the robot may simulate the mother based on simulated object data that is generated through previous learning about the mother and that corresponds to the mother, to interact with the child. Alternatively, in a process in which the child interacts with the parent, when the child shows interest in specific knowledge or a specific phenomenon, the robot may select related simulated object data to simulate a corresponding companion object, to interact with the child.

The server or the robot obtains, through analysis based on the received picture/video in the film, a name of the film watched by the child, and obtains, through analysis based on an action picture/video/voice of the child, whether the child likes a figure in the film, so that the server or the robot obtains the name of the film that the child is watching, a name of an idol of the child, and even a fragment of the idol of the child. For example, the robot obtains, through analysis, that the child is fond of watching "Frozen", and likes the princess Elsa. The server queries idol information on the Internet based on the film name and idol name information, to model the idol based on the idol information, so that the robot can simulate the idol that interests the child.

Data processing of an object simulated by the robot: An object that interests the child may be stored in a local database of the robot. For an object that does not interest the child, a positive thing that is suitable for an age of the child is selected, and is played or simulated to the child for watching.

Images captured in different expressions of the child are operated in different manners. When the child shows expressions of delight, surprise, and the like, it indicates that the child is interested in current things, but the things are not necessarily suitable to the child. In this case, appropriate data needs to be selected for interaction with the child. When the child shows expressions of anger, disgust, and the like, it indicates that the child does not like current things, but the current things may be beneficial to growth of the child. In this case, the robot needs to interact with the child by using data of the things, to guide the growth of the child. For example, for a thing that interests the child, it is determined whether the thing is historically interested. If the thing is historically interested, the robot may directly search the local database for related data, selecting data that matches the age of the child, and then interact with the child.

For example, when it is detected, from an image, that the child is reading "The Little Prince", the robot searches the local database for data related to "The Little Prince". If the robot can find content, it indicates that "The Little Prince" is historically interested, and the robot may directly play or simulate data (illustrations, animated videos, story voices, and the like of "The Little Prince") in the local database to the child for watching.

If a thing appears for a first time (there is no related information in the local database), the robot needs to determine impact exerted on the child by the thing, and selects positive information. A specific method may be: obtaining a material or an introduction of a thing through searching by using a network server, and determining a feature of the thing. For example, when it is detected, in an image, that the child is watching an animated film "Conan", and the robot finds, by using the network server, that this film has some violent content that is not suitable for a child under 6 years old, the robot ignores the content. When it is detected, in an image, that the child is watching an animated film "Pleasant Goat and Big Big Wolf", and the robot finds, by using the network server, that this film is suitable for a child under 5 years old, the robot downloads data related to "Pleasant Goat and Big Big Wolf" locally, to interact with the child at any time.

The robot directly confirms with the parent whether the thing can be used to interact with the child. After getting approval from the parent, the robot can directly download related data from the network server to interact with the child.

For a thing that the child dislikes, it is determined whether the thing is beneficial to growth of the child. A determining manner may be: confirming with the parent, or confirming by using the network server. A specific manner is similar to the foregoing step. When it is determined that the thing is beneficial to the growth of the child, the robot may gradually interact with the child.

The robot may directly play or simulate the thing (an expression/audio/an action, or the like), and simultaneously detect a reaction of the child to the thing by using a camera.

For data that the child likes (an expression of delight or the like), the robot stores related data in the local database. For data that the child dislikes (an expression of disgust or the like), if the data has been stored in the local database, the robot may directly delete the data from the local database, or may determine, after confirming with the parent, whether to delete the data; if the data has not been stored in the local database, the robot may directly not store the data, or may determine, after confirming with the parent, whether to store the data.

Figure 5:
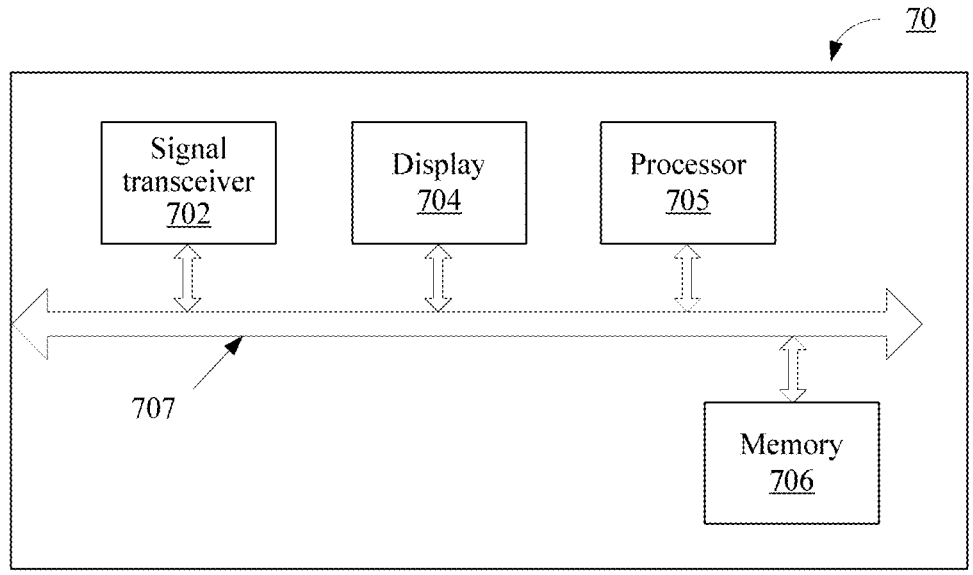
FIG. 5 is a schematic structural diagram of a service server according to an embodiment of the present invention.

An embodiment of the present invention further provides a service server, which may be a third-party cloud server, a child growth server, or a social public cloud server. The server includes a processor with processing and calculation capabilities and functions, to perform each method step or function for interaction with a robot in the foregoing solution. Referring to FIG. 5, a server 70 includes a processor 705, a signal transceiver 702 that communicates with another device, and a memory 706 that stores data, a program, and the like. The server 70 may further include various appropriate components, such as a display 704 and an input/output device (not shown). The various components are connected by using a bus 707, and are controlled and managed by the processor.

The server cooperates with the robot, sorts out simulated object data for the robot, and stores a simulated object database. The signal transceiver 702 receives sensing information of a companion object of a target object and emotion information of the target object that is obtained when the target object interacts with the companion object. The sensing information and the emotion information are sent by the robot. As mentioned above, the sensing information includes at least one of view information and voice information. The signal transceiver 702 sends, to the robot, the simulated object data generated by the processor. The processor 705 extracts an emotion feature quantity from the emotion information, determines, based on the emotion feature quantity, an emotional pattern used by the target object to interact with the companion object, determines, based on the emotional pattern, a degree of interest of the target object in the companion object, extracts behavioral data of the companion object from the sensing information based on the degree of interest, and screens the behavioral data to obtain the simulated object data. As mentioned above, the simulated object data is used by the robot to simulate the companion object, and the virtual simulated object is used to describe the companion object. The memory on the server is configured to store the simulated object database to record the simulated object data.

In one embodiment, a parent has a data terminal, and can directly create a simulation constraint condition on the data terminal. After obtaining data, the robot or the server matches the data with the simulation constraint condition, and generates the simulated object data by using behavioral data that meets the simulation constraint condition. Alternatively, the parent directly instructs a behavior of the robot by using the data terminal or the server. The data terminal may be a remote control device that matches the robot, or may be an intelligent terminal on which an associated application is installed. A selection instruction sent by the data terminal can be received by using a transceiver of the robot or the signal transceiver of the server.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

What is claimed is:

1. A human-machine interaction method, executed by a companion robot, comprising:
    detecting and collecting, by the companion robot, sensing information of a companion object and emotion information of a target object when the target object interacts with the companion object, wherein each of the emotion information and the sensing information comprises at least one of view information or voice information, the companion object is a caregiver or a guardian of the target object;
    extracting, by the companion robot, an emotion feature quantity based on the emotion information;
    determining, by the companion robot, based on the emotion feature quantity, an emotional pattern used by the target object to interact with the companion object;
    determining, by the companion robot, based on the emotional pattern, a degree of interest of the target object in the companion object;
    extracting, by the companion robot, behavioral data of the companion object from the sensing information based on the degree of interest;
    screening, by the companion robot, the behavioral data to extract a behavioral key feature; and
    generating, by the companion robot, simulated object data by using the behavioral key feature, wherein the simulated object data is used by a robot to simulate the companion object and the simulated object data is used to describe the companion object; wherein the behavioral data comprises a body action, the behavioral key feature comprises a body key point or a body action unit, and the behavioral key feature is generated through statistical learning or machine learning; or
    wherein the behavioral data comprises an expression, the behavioral key feature comprises a partial face key point or a facial action unit, and the behavioral key feature is generated through pre-specification or machine learning; or
    wherein the behavioral data comprises a tone, the behavioral key feature comprises an acoustic signal feature in voice input of the companion object, and the behavioral key feature is generated through pre-specification or machine learning.

2. The human-machine interaction method according to claim 1, further comprising:
    sending, by the companion robot, the sensing information and the emotion information to a service server; and
    wherein the extracting the emotion feature quantity based on the emotion information, determining the emotional pattern used by the target object to interact with the companion object, determining the degree of interest of the target object in the companion object, extracting the behavioral data of the companion object from the sensing information based on the degree of interest, and screening the behavioral data to obtain the simulated object data comprise:
        obtaining, by the companion robot, the simulated object data from the service server, wherein the simulated object data is obtained after the server extracts the emotion feature quantity based on the emotion information;
        determining, by the companion robot, based on the emotion feature quantity, the emotional pattern used by the target object to interact with the companion object;
        determining, by the companion robot, based on the emotional pattern, the degree of interest of the target object in the companion object;
        extracting, by the companion robot, the behavioral data of the companion object from the sensing information based on the degree of interest; and
        screening, by the companion robot, the behavioral data.

3. The method according to claim 1, wherein the screening the behavioral data to obtain the simulated object data comprises:
    matching, by the companion robot, the behavioral data with a simulation constraint condition, and
    generating, by the companion robot, the simulated object data by using behavioral data that meets the simulation constraint condition.

4. The method according to claim 1, wherein the screening the behavioral data to obtain the simulated object data comprises:
    sending, by the companion robot, the behavioral data to a data terminal,
    receiving, by the companion robot, a selection instruction from the data terminal, and
    generating, by the companion robot, the simulated object data based on the selection instruction.

5. The method according to claim 1, further comprising:
    detecting and collecting environment information, or collecting emotion information of the target object again, and determining a current interaction scenario, by the companion robot;
    selecting, from a simulated object database based on the current interaction scenario, simulated object data used in current interaction, by the companion robot; and
    simulating, by the companion robot, a corresponding companion object based on the simulated object data used in the current interaction, to interact with the target object.

6. The human-machine interaction method according to claim 1, wherein the companion object further comprises audiovisual data, and the sensing information comprises a view of the audiovisual data; and
    wherein the determining, based on the emotional pattern, a degree of interest of the target object in the companion object comprises:
    determining, by the companion robot, based on the emotional pattern, a degree of interest in a film and television role or film and television sound in the audiovisual data.

7. The human-machine interaction method according to claim 1, wherein the detecting and collecting emotion information of the target object that is obtained when the target object interacts with the companion object comprises:
    detecting and collecting, by the companion robot, a face image or a video of the target object; and
    the extracting an emotion feature quantity based on the emotion information, and determining, by the companion robot, based on the emotion feature quantity, an emotional pattern used by the target object to interact with the companion object comprises:
    extracting, by the companion robot, a visual feature from the face image or the video,
    obtaining, by the companion robot, a facial animation parameter as a visual emotion feature, and
    matching, by the companion robot, the extracted visual feature with a visual emotion feature database, to identify an emotion feature of the target object and determine the emotional pattern.

8. A companion robot, comprising:
a sensor module configured to detect and collect sensing information of a companion object and emotion information of a target object when the target object interacts with the companion object, wherein each of the emotion information and the sensing information comprises at least one of view information or voice information, the companion object is a caregiver or a guardian of the target object;
a processor configured to:
extract an emotion feature quantity based on the emotion information;
determine, based on the emotion feature quantity, an emotional pattern used by the target object to interact with the companion object;
determine, based on the emotional pattern, a degree of interest of the target object in the companion object;
extract behavioral data of the companion object from the sensing information based on the degree of interest;
screen the behavioral data to extract a behavioral key feature, and generate simulated object data by using the key feature,
wherein the behavioral data comprises a body action, the behavioral key feature comprises a body key point or a body action unit, and the key feature is generated through statistical learning or machine learning; or
wherein the behavioral data comprises an expression, the behavioral key feature comprises a partial face key point or a facial action unit, and the key feature is generated through pre-specification or machine learning; or
wherein the behavioral data comprises a tone, the behavioral key feature comprises an acoustic signal feature in voice input of the companion object, and the key feature is generated through pre-specification or machine learning;
generate an action instruction based on the simulated object data; and
a behavior execution module configured to receive the action instruction of the processor and interact with the target object.

9. The companion robot according to claim 8, further comprising:
a memory configured to store a simulated object database to record the simulated object data; and
the processor is further configured to:
select, from the simulated object database based on a current interaction scenario,
simulated object data used in current interaction; and
control the behavior execution module based on the simulated object data.

10. The companion robot according to claim 8, further comprising:
a communications module configured to:
send, to a service server, the sensing information of the companion object of the target object and the emotion information of the target object that is obtained when the target object interacts with the companion object; and
receive the simulated object data sent by the service server.

11. The companion robot according to claim 8, wherein the processor is configured to:
screen the behavioral data by matching the behavioral data with a simulation constraint condition; and
generate the simulated object data by using behavioral data that meets the simulation constraint condition.

12. The companion robot according to claim 8, wherein the sensor module is further configured to detect and collect environment information; and
the processor is further configured to determine a current interaction scenario based on the environment information and the emotion information.

13. A server, comprising:
a processor and a signal transceiver, wherein the signal transceiver is configured to:
receive sensing information of a companion object and emotion information of a target object when the target object interacts with the companion object, wherein the sensing information and the emotion information are sent by a robot, and the sensing information comprises at least one of view information or voice information, the companion object is a caregiver or a guardian of the target object; and
send simulated object data to the robot, wherein the simulated object data is used by the robot to simulate the companion object, and the simulated object data is used to describe the companion object; and
the processor is configured to:
extract an emotion feature quantity from the emotion information;
determine, based on the emotion feature quantity, an emotional pattern used by the target object to interact with the companion object;
determine, based on the emotional pattern, a degree of interest of the target object in the companion object;
extract behavioral data of the companion object from the sensing information based on the degree of interest;
screen the behavioral data to extract a behavioral key feature, and
generate the simulated object data by using the behavioral key feature,
wherein the behavioral data comprises a body action, the behavioral key feature comprises a body key point or a body action unit, and the behavioral key feature is generated through statistical learning or machine learning; or
wherein the behavioral data comprises an expression, the behavioral key feature comprises a partial face key point or a facial action unit, and the behavioral key feature is generated through pre-specification or machine learning; or
wherein the behavioral data comprises a tone, the behavioral key feature comprises an acoustic signal feature in voice input of the companion object, and the behavioral key feature is generated through pre-specification or machine learning.

14. The server according to claim 13, further comprising:
a memory configured to store a simulated object database to record the simulated object data, wherein the processor is further configured to:
obtain currently used simulated object data from the simulated object database, or
generate an action instruction based on currently used simulated object data; and
wherein the signal transceiver is further configured to send the currently used simulated object data or the action instruction to the robot.

* * * * *